Feb. 24, 1970   L. A. WARNER   3,497,681
NAVIGATIONAL COMPUTER
Filed Sept. 10, 1968   9 Sheets-Sheet 1

INVENTOR
LOUIS A. WARNER
BY
ATTYS.

Feb. 24, 1970 L. A. WARNER 3,497,681
NAVIGATIONAL COMPUTER
Filed Sept. 10, 1968 9 Sheets-Sheet 2

INVENTOR
LOUIS A. WARNER
BY
Dominik, Knechtel, of Godula
ATTYS.

Feb. 24, 1970

L. A. WARNER 3,497,681

NAVIGATIONAL COMPUTER

Filed Sept. 10, 1968

INVENTOR
LOUIS A. WARNER

BY

*Dominik, Knechtel, & Godula*

ATTYS.

Feb. 24, 1970    L. A. WARNER    3,497,681
NAVIGATIONAL COMPUTER
Filed Sept. 10, 1968    9 Sheets-Sheet 4

INVENTOR
LOUIS A WARNER
BY
Dominik, Knechtel, & Godula
ATTYS.

Feb. 24, 1970  L. A. WARNER  3,497,681
NAVIGATIONAL COMPUTER

Filed Sept. 10, 1968  9 Sheets-Sheet 5

INVENTOR
LOUIS A. WARNER
BY
ATTYS.

Feb. 24, 1970  L. A. WARNER  3,497,681
NAVIGATIONAL COMPUTER
Filed Sept. 10, 1968  9 Sheets-Sheet 6

INVENTOR
LOUIS A WARNER
BY
ATTYS.

Feb. 24, 1970

L. A. WARNER 3,497,681

NAVIGATIONAL COMPUTER

Filed Sept. 10, 1968

INVENTOR
LOUIS A WARNER

BY

ATTYS.

Feb. 24, 1970  L. A. WARNER  3,497,681
NAVIGATIONAL COMPUTER

Filed Sept. 10, 1968  9 Sheets-Sheet 8

INVENTOR
LOUIS A WARNER
BY
ATTYS.

Feb. 24, 1970   L. A. WARNER   3,497,681
NAVIGATIONAL COMPUTER
Filed Sept. 10, 1968   9 Sheets-Sheet 9

INVENTOR
LOUIS A. WARNER
BY
ATTYS.

3,497,681
NAVIGATIONAL COMPUTER
Louis A. Warner, 5223 N. Natoma, Chicago, Ill. 60656
Continuation-in-part of application Ser. No. 727,522, May 8, 1968. This application Sept. 10, 1968, Ser. No. 758,819
Int. Cl. G06c 27/00
U.S. Cl. 235—78                                       4 Claims

ABSTRACT OF THE DISCLOSURE

A navigational computer for solving wind vector problems including three concentrically mounted rotatable discs of progressively smaller diameters having cooperatively arranged log cosine, log sine and log speed scales and a 360° compass rose thereon, for setting and reading effective true air speeds and ground speeds, true air speeds and true air speed components.

---

This application is a continuation-in-part application of United States patent application, Ser. No. 727,522, filed May 8, 1968.

This invention relates, in general, to navigational computers and, in particular, to navigational computers for solving wind vector problems.

In United States Patent 2,775,404, there is disclosed a navigational computer for computing the speed and direction of the wind while in flight, based on certain given navigational data, and for computing the magnetic heading and ground speed for planning a flight when the speed and direction of the wind is forecast or known. Generally, the computer has a log cosine scale, a log sine scale and a logarithm speed scale on it which cooperate to perform computations and solutions of wind vector problems. The air speed and the wind are resolved into components by performing the necessary trigonometric computations, on these scales, by the relative positioning of the discs of the computer. The computer also has a graphical portion which is formed by a circular grid and a rectangular grid superimposed with one another. The mathematical relationship between these grids and the cooperating log speed scale and the log sine and cosine scales is such as to permit direct reading after an initial setting is made. The subject patent contains a detailed explanation of the theory and the operation of the computer to solve navigational wind vector problems.

The computer of the present invention is generally like the computer of the United States Patent 2,775,404, in that it also has a log cosine scale, a log sine scale and a logarithm speed scale for solving navigation wind vector problems. However, the circular and rectangular grids forming the graphical portion of the latter computer have been eliminated, in several embodiments, and have been replaced with mechanical computer means. These mechanical computer means are used in cooperation with a pair of straight lines which perpendicularly intersect one another at the central axis of the computer, to permit direct readings to be made, after the computer is initially set up. Improved log cosine, log sine and numerical log speed scales also are provided so that the computer, while operating on the same theory as the computer of the subject patent, is far more accurate, is easier to read, and eliminates the need to interpret and/or interpolate the readings. Other improved features also are provided, as will be apparent from the description below.

In another embodiment of the invention, the log cosine scale, the log sine scale and the logarithm speed scale are arranged in a fashion such that navigation wind vector problems can be easily and readily solved trigonometrically. Furthermore, means are provided for temporarily recording certain computed data so that the party using the computer need not rely upon his memory while solving problems. The computer therefore is more easily used, and the likelihood of errors resulting is substantially reduced.

Accordingly, it is an object of the present invention to provide improved navigational computers, particularly of the type adapted to solve navigational wind vector problems.

Another object is to provide improved navigational computers of the above type which have a design such that the solutions can be more accurately computed and read.

Still another object is to provide improved navigational computers of the above type having mechanical cursor means which are operable to accurately determine the wind components.

Another object is to provide improved navigational computers of the above type having a log cosine scale, a log sine scale and a logarithm speed scale arranged thereon in a fashion such that navigational wind vector problems can be easily and readily solved trigonometrically.

Still another object is to provide improved navigational computers of this latter type having means provided thereon for temporarily recording certain computed data.

A still further object is to provide improved navigational computers of the above type which are of a simple, inexpensive construction, yet sturdy, accurate and compact.

Other objects of the invention will in part be obvious and will in part appear hereinafter.

The above objectives are accomplished with a navigational computer which includes, generally, a base, a pair of intermediate discs, and a top disc, all affixed together in a concentric fashion and rotatable relative to one another. One of the intermediate discs has a log cosine scale and a log sine scale on it which are cooperatively arranged with a logarithm speed scale on the base disc to set or read crab angles, effective true air speeds and wind-speed components. The base disc also has a true course index on it which functions with a 360° compass rose on the other one of the intermediate discs, to set or read true courses and true headings. The top discs has a wind direction arrow for setting or reading wind speeds, and according to several of the disclosed embodiments, a mechanical wind component computing device including a cursor slider which is slidably affixed to the top disc and a cursor which is pivotally affixed to the cursor slider, is provided for setting or reading wind components. The cursor slider is cooperatively arranged with the wind-speed scale on the top disc and has an index for setting or reading wind speeds on the wind-speed scale. The cursor pivotally affixed to the cursor slider has a wind-speed component scale on it and, when the wind direction arrow is set in the direction of the wind and the index on the cursor slider is set over the wind speed on the wind-speed scale on the top disc, the wind components can be read or set on the wind-speed component scale on the cursor, by pivotally moving the latter so that it extends perpendicular to and over respective ones of a pair of reference lines on the base disc, and reading or setting the wind components at the points where the reference lines intersect the wind-speed component scale on the cursor. In a preferred embodiment, the top disc is eliminated and only an arm having a wind direction arrow and a reference index is used. The cursor slider, in this case, is slidably affixed to and cooperatively arranged with the arm. With these arrangements of the computer, more accurate readings can be made, directly and without the need of interpreting or interpolating the indicated wind-speed component values.

In accordance with another one of the disclosed embodiments, the top disc is provided with several matted surface areas which are appropriately labeled for recording certain computed data that is used to solve navigational wind vector problems. After using this data, it is removed simply by erasing or otherwise removing it. The log cosine scale, the log sine scale and the logarithm speed scales, in particular, are arranged in a fashion such that the wind vector problems can be easily solved trigonometrically.

The invention accordingly comprises an article of manufacture possessing the features, properties, and the relation of elements which will be exemplified in the article hereinafter described.

For a fuller understanding of the nature and objects of the invention, reference should be had to the following detailed description taken in connection with the accompanying drawings, in which.

Similar reference characters refer to similar parts throughout the several views of the drawings.

Figure 1:
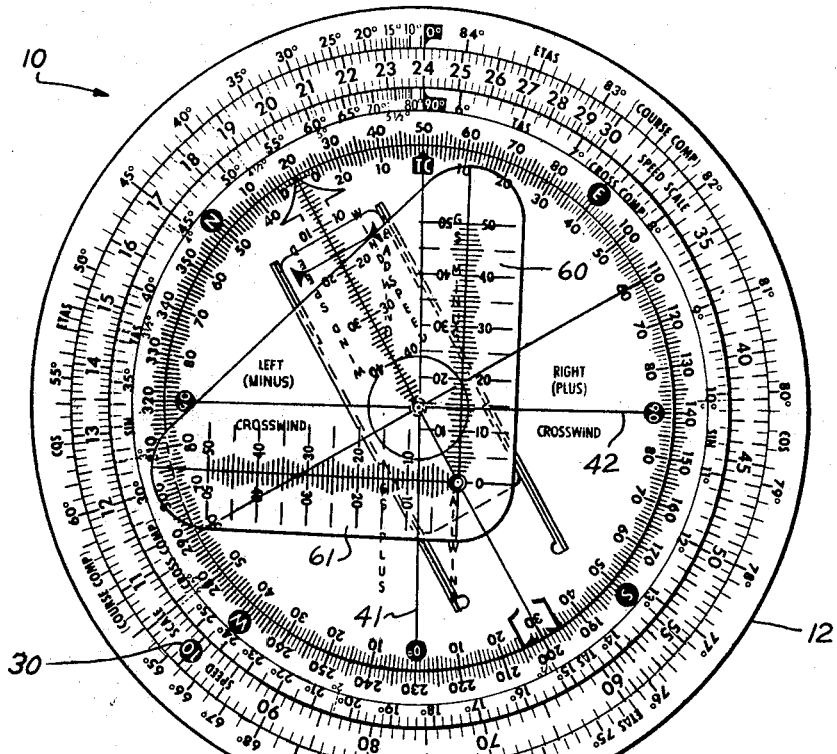
FIG. 1 is a top plan view of a navigational computer exemplary of the invention.
Figure 2:
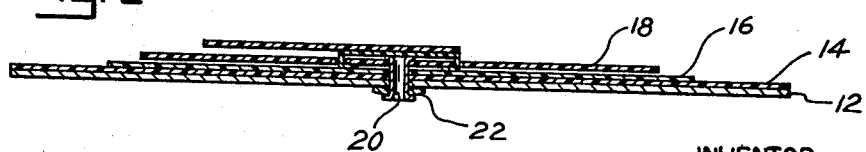
FIG. 2 is a sectional view of the computer, taken along lines 2—2 of FIG. 1.
Figure 3:
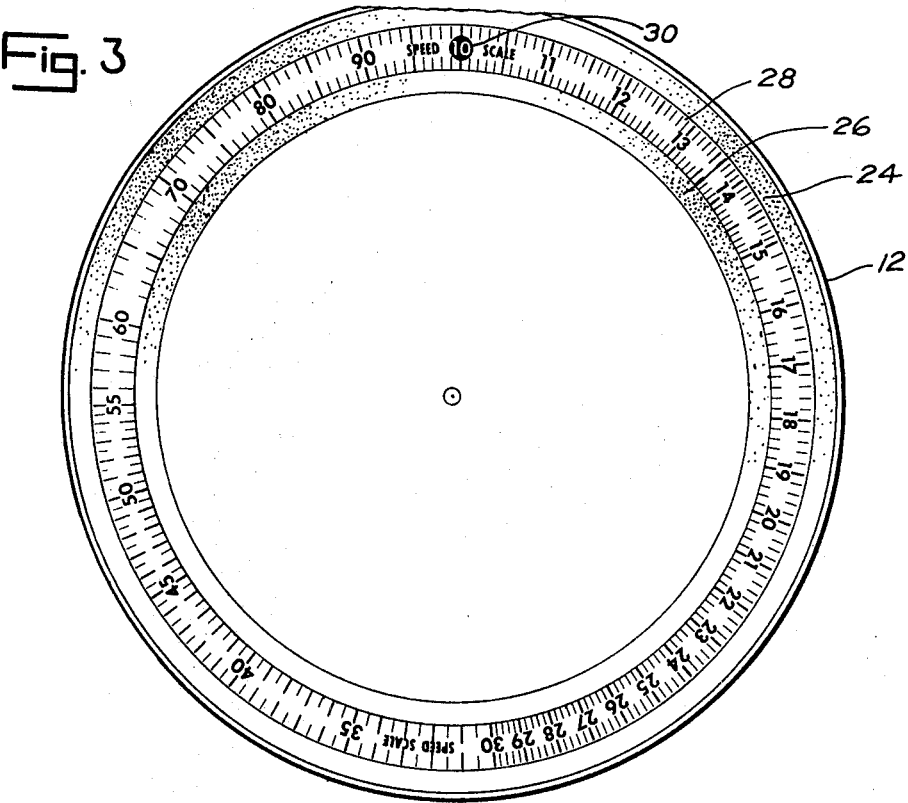
FIG. 3 is a top plan view of the base disc of the computer of FIG. 1.

Referring now to the drawings, in FIG. 1 there is illustrated a computer 10 having four circular discs 12, 14, 16 and 18 which are affixed together, concentrically, atop one another, as illustrated in FIG. 2, by means of a grommet 20 and a spring washer 22. Each of the discs 12, 14, 16 and 18 is rotatable with respect to the others, as described more fully below. The circular disc 12, is opaque and, as can be best seen in FIG. 3, has two spaced-apart annular rings 24 and 26 thereon, between which is a logarithmic speed scale 28. The rings 24 and 26 each is colored so to both color-code and highlight a log cosine scale 32 and a log sine scale 34, respectively, on the disc 14. The speed scale 28 has an index 30 which, in the illustrated example, is a solid-colored circle having the numeral 10 therein.

Figure 4:
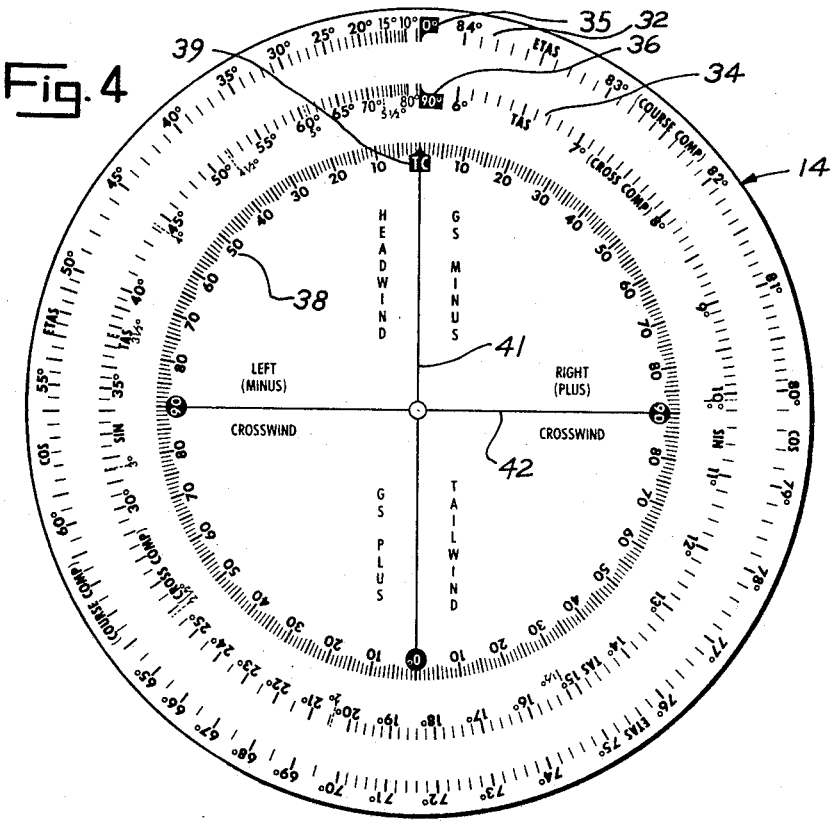
FIG. 4 is a top plan view of the intermediate disc of the computer of FIG. 1 which is positioned atop the base disc.

The disc 14 is of a transparent material and is affixed atop the disc 12 (FIG. 2). As can be best seen in FIG. 4, the disc 14 has a diameter substantially the same as that of the disc 12. The log cosine scale 32 and the log sine scale 34 are printed peripherally about the face of the disc 12, in positions so as to overlay the annular rings 24 and 26, respectively, and have indexes 35 and 36, respectively, which are positioned directly opposite one another, on each of the opposite sides of the speed scale 28. As indicated above, the rings 24 and 26 both color-code and highlight the log cosine and the log sine scales so that they can be easily observed and read.

While it will be appreciated that a logarithmic scale never reaches the zero value, for the purpose of this computer, the indexes 35 and 36 are labeled 0° and 90°, respectively, and are considered as the origin or starting point of the log cosine and sine scales 32 and 34.

The log cosine scale 32 extends about the periphery of the disc 12 in a counter-clockwise manner, while the log sine scale 34 extends about the disc 12 in a clockwise fashion. Also, for all practical purposes, each of these scales extends from 0° to 90° so that any angle can be read directly on either of the two scales, without the need of converting it.

The disc 14 also has a true course index 39, which is labeled TC, positioned such that it lies adjacent and is functionally associated with a 360° compass rose 40 formed on the disc 16 (described below). The index 39 and the indexes 35 and 36 all are aligned in a fashion such that each of them would lie along a radial line extended outwardly from the central axis (defined by the grommet 20) of the computer 10, to its outer edge, for reasons set forth below. A scale 38 which is graduated from 0° to 90° and then from 90° to 0°, in both a clockwise and a counter-clockwise direction from the true course index 39, also is provided on the disc 14, for determining drift corrections and relative wind angles, in a manner described below.

Straight reference lines 41 and 42 are provided on the disc 14 and function in conjunction with a wind-speed component scale 60 (described below) to set or read wind-speed components. These reference lines 41 and 42 are of equal length and perpendicularly intersect one another, at their midpoints, at the central axis of the computer 10. The reference lines 41 and 42 also are positioned so that one of them, in the illustrated example, reference line 41, is aligned with and extends inwardly from the index 39.

Indicia is printed on the face of the disc 14 for indicating, for example, whether the computed wind components are right or left crosswinds, and head or tailwinds.

Figure 5:
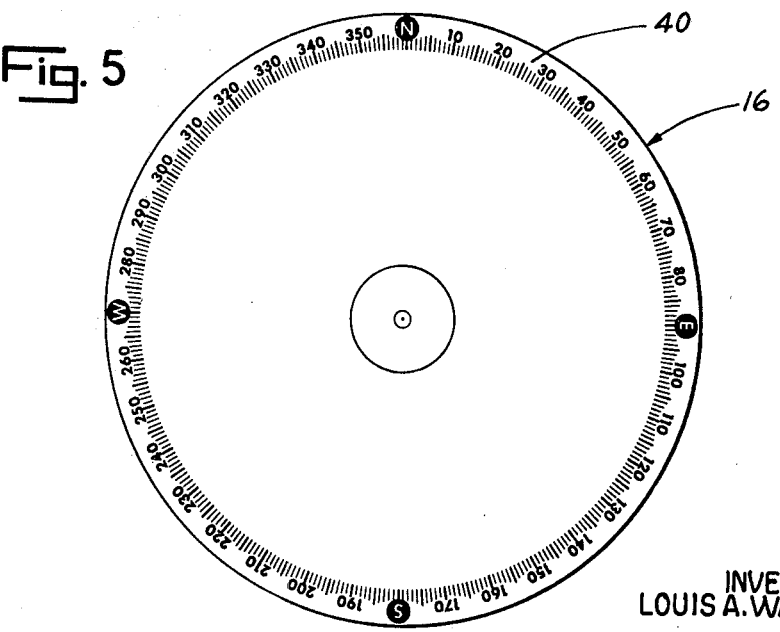
FIG. 5 is a top plan view of the other one of the intermediate discs, illustrating the 360° compass rose thereon.

The disc 16 (FIG. 5) also is transparent and, as can be seen in FIG. 2, is affixed atop the disc 14. The diameter of the disc 16 preferably substantially corresponds to the smaller diameter of the annular ring 26, that is, its diameter at the inside edge thereof, and the 360° compass rose 40 is printed on the outer marginal edge thereof.

Figure 6:
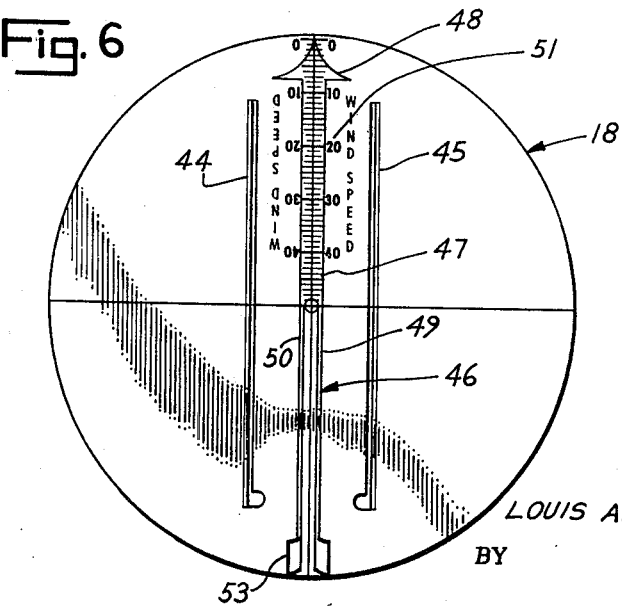
FIG. 6 is a top plan view of the top disc of the computaer of FIG. 1, illustrating the wind-speed scale formed on it.

The disc 18 (FIG. 6) likewise is of a transparent material and, in FIG. 2, it can be seen that it is affixed atop the disc 16. The disc 18 has a diameter such that its peripheral edge extends adjacent the compass rose 40 of the disc 16. A pair of spaced-apart, parallel elongated slots 44 and 45 are formed in the disc 18, at equal spaced distances on the opposite sides of the central axis of the computer 10, respectively. A wind direction arrow 46 extends diametrically across the disc 18, between the slots 44 and 45. This wind direction arrow 46 advantageously is defined by a solid shaft portion 47 extending from the central axis outward to the edge of the disc 18 where it terminates with an arrowhead 48 and by a pair of parallel lines 49 and 50 extending in the opposite direction from the central axis to the edge of the disc 18 where it terminates with a tail 53. A wind-speed scale 51 is provided on the disc 18 and is cooperatively arranged with the wind direction arrow 46. The wind-speed scale 51 has indicia in the form of straight lines which are extended transversely across the shaft portion 47 and which are numbered in tens, in increasing value from 0 knots at the tip of the arrowhead 48 to 50 knots at the central axis of the computer 10.

Figure 7:
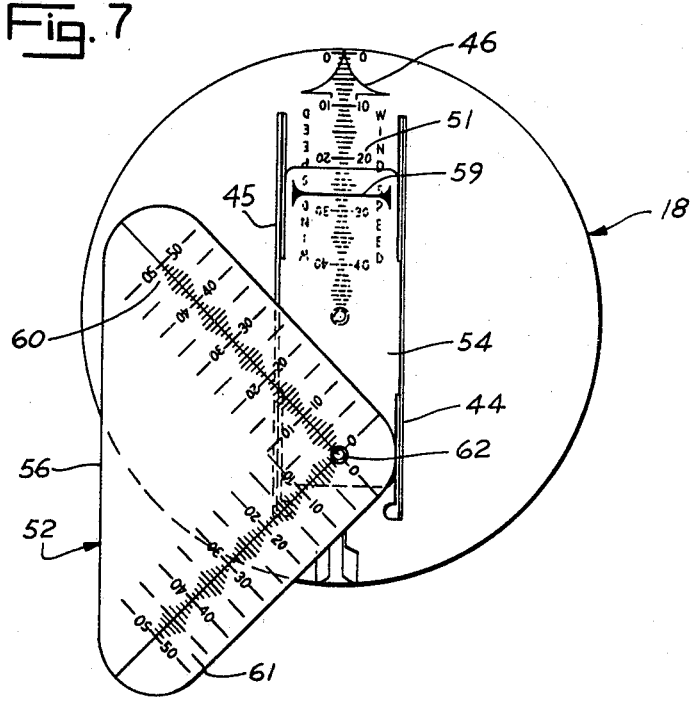
FIG. 7 is a top plan view of the top disc of the computer of FIG. 1, illustrating the mechanical wind component computing device affixed to it.

As can be best seen in FIG. 7, a wind-speed component computing device 52 is affixed to the disc 16 and includes a cursor slider 54. The cursor slider 54 has a pair of outwardly extending flanges (not shown) which are reversely folded so as to extend through respective ones of the slots 44 and 45 to slidably secure the cursor slider 54 and hence the computing device 52 to the disc 18. The cursor slider 54 has an index 59 on it, which index is a line extending transversely across it and positioned so as to cooperate with the wind-speed scale 51. The index 59 is aligned with the indicia of the wind-speed scale 51, to apply a wind-speed value to the computer 10, as described more fully below.

The cursor 56 is generally triangular-shaped and is pivotally affixed to the cursor slider 54 by means of a grommet 62. Two wind-speed component scales 60 and 61 which are like the wind-speed scale 51 are provided on the cursor 56 and extend perpendicular to one another. The wind-speed component scales 60, 61 increase from 0 knots at the grommet 62 to 50 knots at their outer ends. The cursor 56 is affixed to the cursor slider 54 in a fashion such that the indicia of the wind-speed scale 51 and the wind-speed component scales 60 and 61 increase in value in opposite directions.

Having now described the construction of the computer 10, its operation in solving an air navigational problem can be described as follows. The problem or solution which is most often encountered is to determine the true heading, the crab angle, and the ground speed while planning a flight, when the true course, the true air speed, the forecast wind direction and wind speed are known. Assuming that:

(1) the true course is 050°
(2) the true air speed is 240 knots
(3) the wind direction is 200°, and
(4) the wind speed is 16 knots, the computer 10 is manipulated in the manner described below to determine the true heading, the crab angle and the ground speed.

The disc 14 is first rotated with respect to the disc 12, to align the indexes 35 and 36 with the indicia corresponding to 240 knots (the true air speed) on the air speed scale 28, as illustrated in FIG. 1. Next, the disc 16 is rotated with respect to one another, to align the true course index 39 with the indicia corresponding to 050° (the true course) on the compass rose 40. Holding the discs 12, 14 and 16 fixed with respect to one another, the disc 18 now is rotated to set the tail 53 of the wind direction arrow 46 to the direction from which the wind blows, that is, in this case, with the indicia corresponding to 200° (the assumed wind direction) on the compass rose 40. With this arrangement, the wind direction arrow 46 permits an actual picture of "how the wind blows" with respect to the aircraft so that the problem can be more easily visualized and solved. The cursor slider 54 is slidably moved to align the index 59 thereon over the indicia corresponding to 15 knots (the wind speed) on the wind-speed scale 51.

After these initial settings have been made, the crosswind components are easily, quickly and accurately determined as follows. The cursor 56 is pivotally moved so that the wind-speed component scales 60 and 61 thereon extend perpendicular to and over respective ones of the reference lines 41 and 42, as illustrated in FIG. 1.

A crosswind component of 8 knots is read on the wind-speed component scale 61, where the reference line 41 intersects it. The crosswind is determined to be a right crosswind, by noting the position of the grommet 62, that is, whether it is positioned to the right or to the left of the reference line 41, and the legend of the disc 12, which, in this case, reads "right crosswind." Accordingly the crosswind component is determined to be a right crosswind of 8 knots.

The value 8 knots is now located on the logarithmic airspeed scale 28 (or, in this case, 80 knots since the indicia 80 can be interpreted as 8.0 or 80 or 800 etc., as in the case of any slide rule) and below it just to the left on the log sine scale 34 the value of approximately 2° is read. The 2° is the crab angle and, since it is a right crosswind, the crab angle is added to the true course of 050° and the true heading is therefore determined to be 052°.

The headwind or tailwind component, as the case may be, is determined by reading the value 14 knots on the wind-speed component scale 60, over the reference line 42, and it is further noted from the position of the grommet 62 and the legend on the disc 12 that this wind component is a tailwind.

Ground speed is determined by adding the tailwind to, or subtracting a headwind from, the cosine component of the true airspeed. The cosine component of the true airspeed, in this case, is determined by observing the air speed value which is aligned with the angle 2° on the log cosine scale 32. For all practical purposes, this value is read at 240 knots, although it is actually slightly less than this. The tailwind of 14 knots is added to this 240 knots, and the ground speed therefore is 254 knots.

From the above description, it is seen that the crosswind components are easily and quickly determined and, furthermore, that they can be read directly from the wind-speed component scales 60 and 61 without the need to interpret the indicated readings, by extending them to intersect another scale or to interpolate the reading on this other scale. It is further apparent that the indicated readings are far more accurate since the wind direction and wind speed both are precisely applied to the computer 10 and the wind-speed components are read directly from the wind-speed component scales 60 and 61 as described above. Furthermore, the computer 10 is extremely accurate at low wind speeds, whereas other similar computers, particularly the computer disclosed in the above-mentioned United States Patent 2,775,404 are not.

Figure 9:
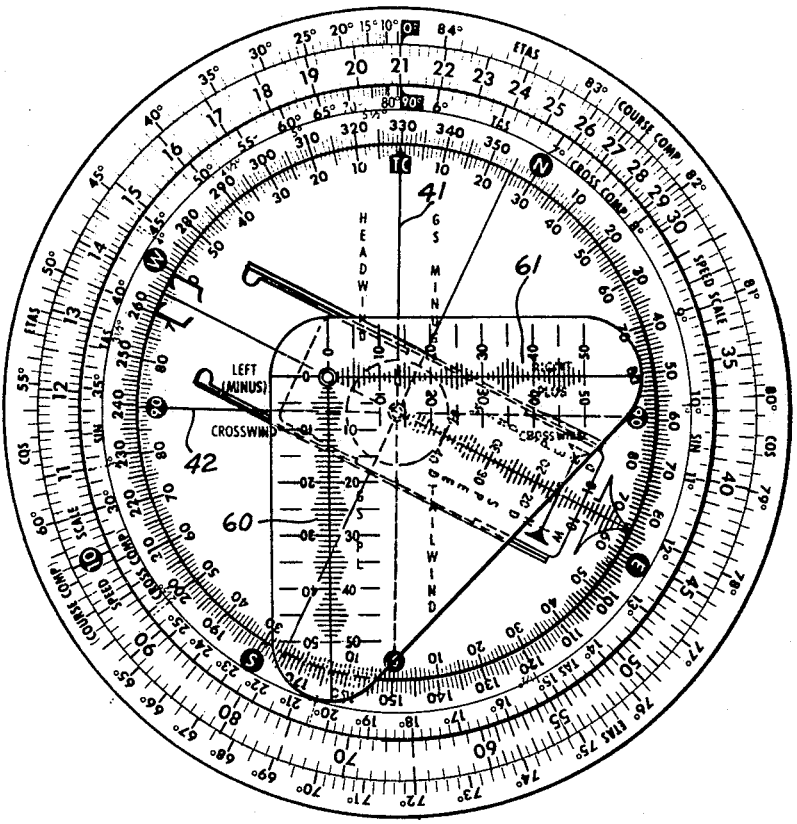
FIG. 9 is a top plan view of the computer, illustrating the manner in which the crosswind and tailwind (or headwind) components are determined, for an assumed navigational wind-speed problem.

In FIG. 9 the computer 10 is illustrated in the manner in which it is initially set up to determine another navigational wind-speed problem. In this case, the known elements are:

(1) True course—330°
(2) True air speed—210 knots
(3) Wind direction—265°
(4) Wind speed—15 knots and again it is desired to determine the true heading, the crab angle and the ground speed.

In FIG. 9 it can be seen that the indexes 35 and 36 of the log cosine scale 32 and log sine scale 34, respectively, are aligned with the true air speed of 210 knots on the logarithmic speed scale 28. The true course of 330° on the compass rose 40 is aligned with the true course index 39 on the disc 14. The tail 53 of the wind direction arrow 46 is aligned with the wind direction of 265° on the compass rose 40, and the cursor slider 54 is positioned to align its index 59 over the wind speed of 15 knots on the wind-speed scale 51.

The cursor 56 is positioned so that the wind speed component scales 60 and 61 extend perpendicular to and over the reference lines 41 and 42, as described above. A headwind component of 7 knots is read on the wind-speed component scale 60, over the reference line 42, and a left crosswind of 13 knots is read on the wind-speed component scale 61, over the reference line 41. By following the steps outline above, the crab angle is determined to be approximately 3.5° and the true heading therefore is 326.5°. The ground speed is determined to be 203 knots.

Another navigational wind-speed problem sometimes encountered is to determine the wind direction and the wind speed, while in flight, when the true course, the true air speed, the true heading and crab angle, and the ground speed are known. To illustrate how the computer 10 is manipulated to determine the wind direction and speed, assume that the aircraft has the following:

(1) True course—330°
(2) True air speed—210 knots
(3) True head—326.5°
(4) Crab angle—3.5°
(5) Ground speed—203 knots To solve this problem, the true air speed of 210 knots on the logarthmic air-speed scale 28 is aligned with the index 35 of the log cosine scale 32, and the true course of 330° on the compass rose 40 is aligned with the true course 39, as illustrated in FIG. 9.

The headwind component is first determined by multiplying the true air speed by the cosine of the crab angle, and then subtracting the ground speed from the determined value. Thus, under 3.5° on the log cosine scale 32, the value of 210 knots is read on the speed scale 28. This is the cosine ground speed component and since it is more than the ground speed, it is apparent that the wind is a headwind. Thus, by substracting the ground speed of 203 knots from the cosine ground-speed component of 210 knots, the headwind component is found to be 7 knots.

Multiplying the true air speed of 210 knots by the sine of the crab angle of 3.5°, the crosswind component is found to be 13 knots. Since the crab angle is to the left, the wind is obviously a left crosswind.

With these two values determined, two legs of the wind component right triangle relative to the true course are now known. The wind direction and speed is determined by applying these two values to the wind-speed component computing device 52, as follows: the cursor 56 is positioned so that the wind speed component scales 60 and 61 extend perpendicular to and over the reference lines 41 and 42. The cursor slider 54 is simultaneously moved to align the left crosswind component of 13 knots on the wind-speed component scale 61 over the reference line 41, then is extended perpendicular to and over the reference line 42. The disc 18 is rotated and the position of the cursor 56 is adjusted while it is rotated to align the headwind of 7 knots on the wind-speed component scale 60 over the reference line 42. In this position, the tail 53 of the wind direction arrow 46 is aligned with the wind direction which, in FIG 9, can be seen to be 265°. The index 59 on the cursor slider 54 also is aligned over the wind speed on the wind-speed scale 51, and the wind speed can be seen to be 15 knots.

Figure 8:
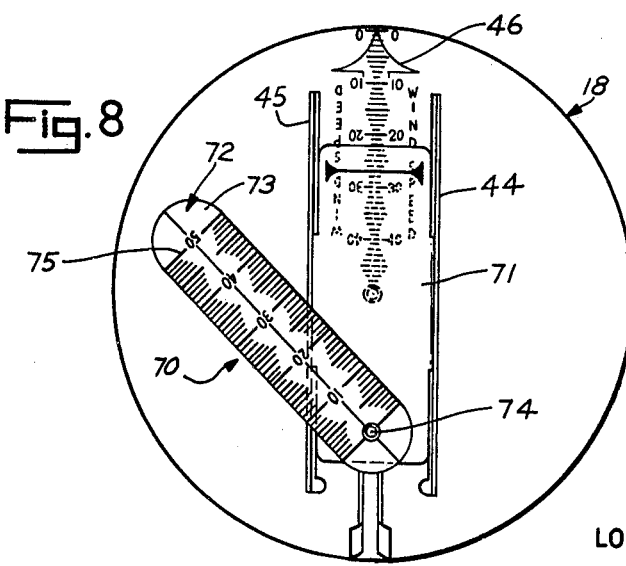
FIG. 8 is a similar top plan view of the top disc of the computer, illustrating a mechanical wind component computing device which is exemplary of a second embodiment of the invention affixed to it.

In FIG. 8, the disc 16 is illustrated having a wind-speed component computing device 70 affixed to it, which includes a cursor slider 71 and a cursor 72. The cursor slider 71 is identical to the cursor slider 54, and is slidably affixed to the disc 16 in a like fashion. The cursor 72, in this case, however, comprises an elongated, generally rectangular-shaped member 73 which is pivotally affixed to the cursor slider 71, by means of a grommet 74. The cursor slider 71 also only has one wind-speed component scale 75 provided on it, which increases from 0 knots at the grommet 74 to 50 knots at its outer end. The wind-speed component scale 75 and the wind-speed scale 51 on the disc 18, therefore increase in value in opposite directions, in the same fashion as the wind-speed component scales 60 and 61, when the cursor 72 is affixed to the cursor slider 71.

In using the wind-speed component computing device 70 to solve an air navigational problem, for example, the navigational problem illustrated in FIG. 1, the discs 12, 14, 16 and 18 are initially set-up in the same manner as described above, when using a computer 10 having a wind-speed component computing device 52 affixed to it.

After these initial settings have been made, however, the cursor 72 is pivotally moved so that it extends perpendicular to and over the reference line 41. A crosswind component of 8 knots is read on the wind-speed component scale 75, where the reference line 41 intersects it. Next, the cursor 72 is pivotally moved so that it extends perpendicular to the other reference line 42. A tailwind of 14 knots is read on the wind-speed component scale 75, where the reference line 42 intersects it.

It can be seen from the above description that the only major difference in the operation of the computer 10 having a cursor 72 affixed to it instead of a cursor 56, is that the cursor 72 must be manipulated so as to position it perpendicular to each of the two reference lines 41 and 42 in order to determine both crosswind components. In the case of the cursor 56, both crosswind components can be determined with only one setting.

Figure 10:
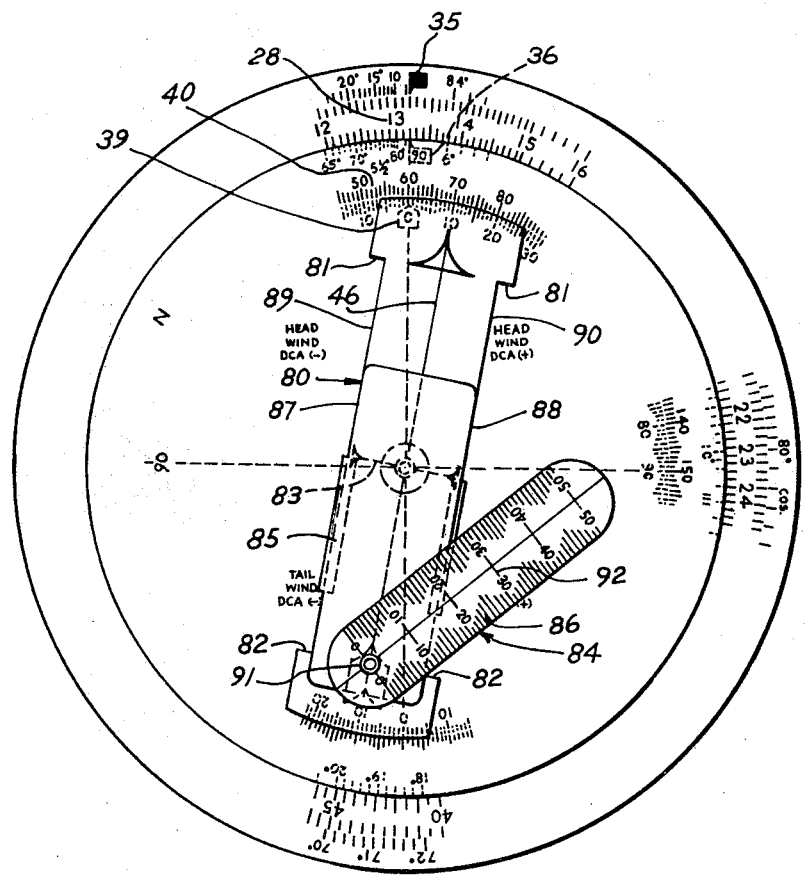
FIG. 10 is a top plan view of the computer, illustrating a modified mechanical wind component computing device affixed to it, and further illustrating the manner in which the computer can be used to solve an assumed navigational wind-speed problem using the law of sines.
Figure 11:
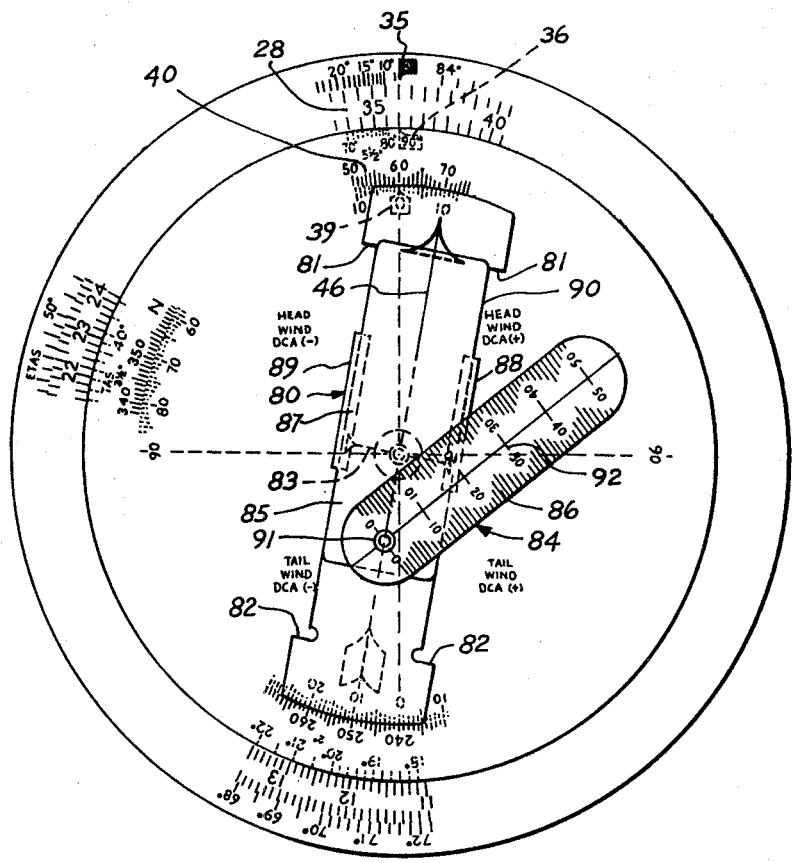
FIG. 11 is a similar top plan view of the computer of FIG. 10, illustrating another setting thereof when solving the assumed navigational wind-speed problem.

In FIGS. 10 and 11, the disc 18 and the wind-speed component computing devices have been substantially modified so as to provide a still more simplified arrangement. It can be seen that the disc 18 is reduced to merely a generally rectangular-shaped arm 80 which is rotatably affixed to and extends diametrically across the disc 16. The end portions at each of the opposite ends of the arm 80 are formed so as to provide stop shoulders 81 and 82, and all of the indicia except for the wind direction arrow 46 has been removed. A single index in the form of a straight line 83 extends across the width of the arm 80 perpendicular to the wind direction arrow 46, at the center of the computer.

The wind-speed component computing device 84, in this case, includes a cursor slider 85 and a cursor 86. The cursor slider 85 is generally rectangular-shaped and has a securing and alignment flanges 87 and 88 integrally formed along each of its opposite sides which are folded over and about the parallel side edges 89 and 90 of the arm 80, to slidably affix the cursor slider to the arm. These flanges also abut the stop shoulders 81 and 82 on the arm 80, so that the cursor slider 85 cannot become disengaged from the arm.

The cursor 86 comprises an elongated, generally rectangular-shaped member which is pivotally affixed to the cursor slider 85, by means of a grommet 91. A single wind-speed scale 92 is provided on the cursor 86, and this wind-speed scale increases from 0 knots at the grommet 91 to 50 knots at its opposite end. This wind-speed scale 92 functions both to set the wind speed and to determine wind-speed components, in a manner described more fully below.

In using this computer to solve an air navigational problem, such as the navigational problem illustrated in FIG. 1, the discs 12, 14 and 16 are initially set-up in the same manner as described above. The arm 80 is rotatably adjusted to align the wind direction arrow 46 in the direction that the wind blows, as illustrated in FIG. 10. The wind speed is set by slidably adjustably positioning the cursor slider 85 and the cursor 86 to align the indicia on the wind-speed scale 92 corresponding to the wind speed, in this case, 15 knots, over the index 83 on the arm 80.

The crosswind component is determined by pivotally moving the cursor 86 so that it extends perpendicular to and over the reference line 41. In this position, the value 8 knots is read on the wind-speed scale 92, where the reference line 41 intersects it. Next, the cursor is pivotally moved so that it extends perpendicular to and over the other reference line 42. A tailwind of 14 knots is now read on the wind-speed scale 92, where the reference line 42 intersects it.

It can be seen that the wind-speed components are determined in generally the same manner with the cursor 86 as they are with the cursor 72. The major advantage and the most desirable features of the last described arrangement is the simplicity of the arrangement and substantially uncluttered appearance of the computing device, due to the elimination of the wind-speed component scales. This arrangement, accordingly, is generally preferred.

Figure 12:
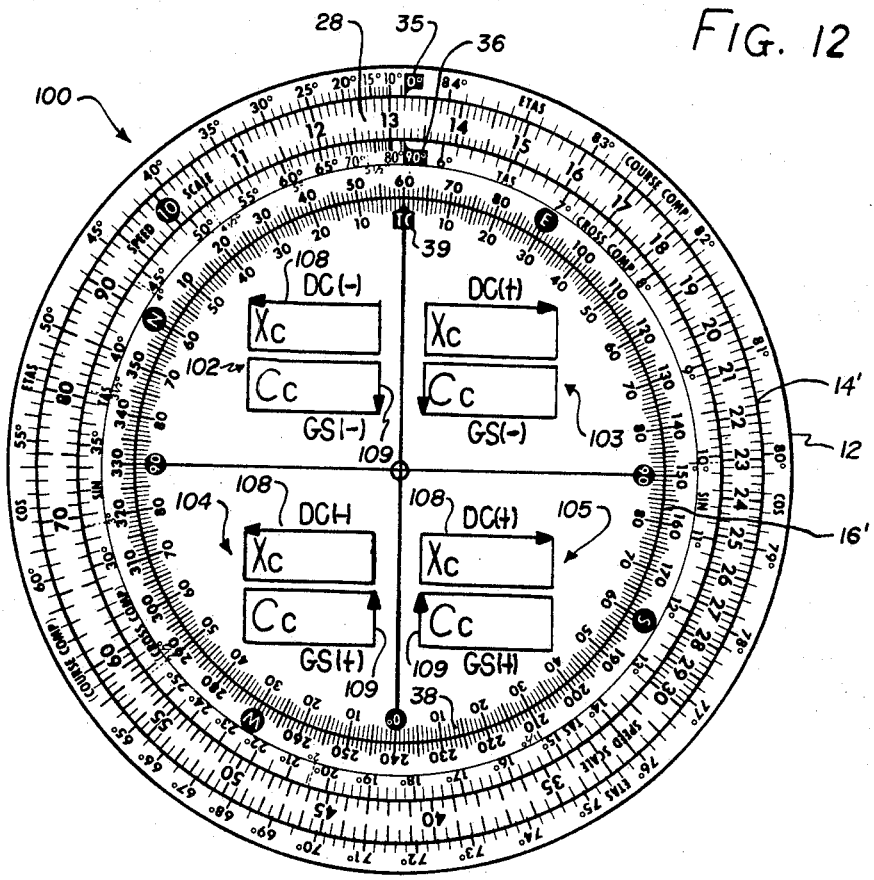
FIG. 12 is a top plan view of another computer exemplary of the invention.
Figure 13:
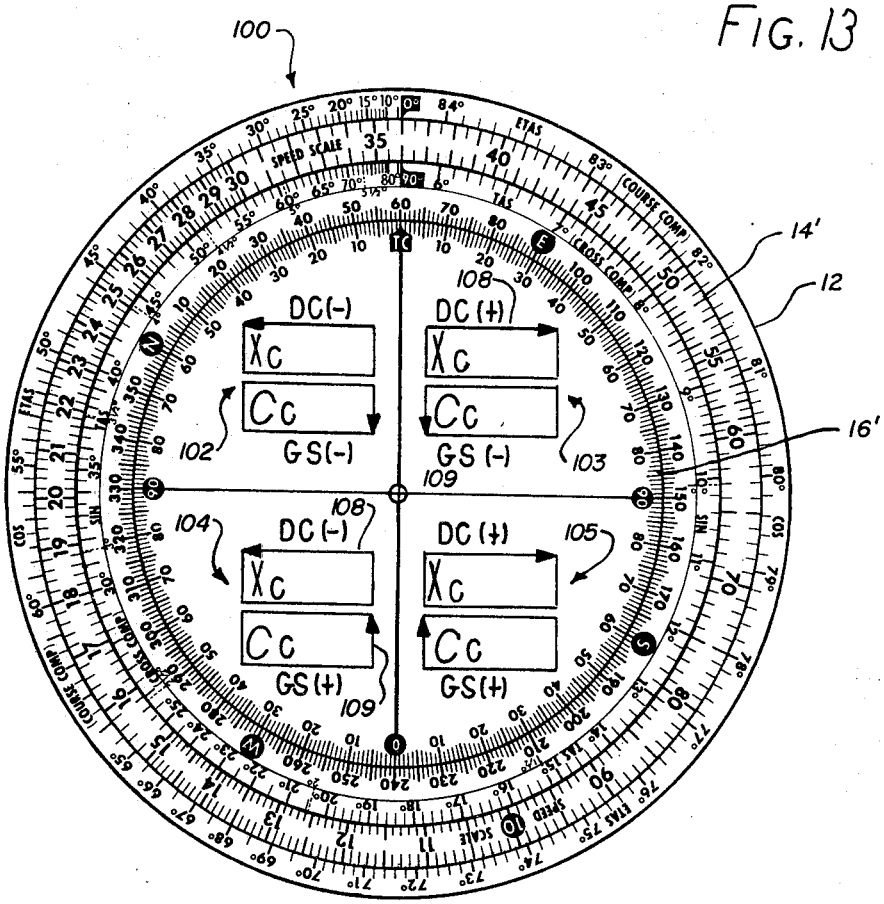
FIG. 13 is another top plan view of the computer of FIG. 12, illustrating the manner in which it is manipulated or set during the solving of a wind problem.
Figure 14:
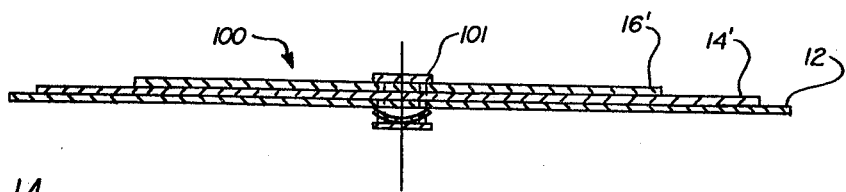
FIG. 14 is a sectional view, illustrating the manner in which the computer of FIG. 12 is assembled.

Referring now to FIGS. 12–14, there is illustrated still another computer 100 having three discs 12, 14' and 16' which are affixed together, concentrically, atop one another, by means of a fastening assembly 101 which may include a grommet and a spring washer of the type illustrated in FIG. 2.

The disc 12 is identical to the disc 12 described above and illustrated in FIG. 3. The disc 14' can be identical to the disc 14 described above and illustrated in FIG. 4, however, in the embodiment illustrated in FIG. 12, the indicia such as the legends headwind and crosswind have been eliminated. The disc 16' is identical to the disc 16 described above and illustrated in FIG. 5, however, the disc 16' has four matted surface areas 102–105 provided on it, for temporarily recording certain computed data, as described more fully below. The matted surface area 102 includes two generally rectangular-shaped boxes labeled XC and CC (for crosswind component and course component, respectively) and has the indicia DC(—) and GS(—) associated with them. The indicia DC(—) indicates that the drift correction is negative and should be subtracted from the true heading, and the indicia GS(—) indicates that the course component is to be subtracted from the effective true airspeed to determine the ground speed. The matted surfaces 103–105 likewise include boxes labeled XC and CC, and indicia indicating the manner in which these computed values are applied to the true course and the effective true airspeed. Arrows 108 and 109 are associated with the boxes labeled XC and CC, respectively, of each of the matted surfaces 102–105. The directions in which these arrows 108 and 109 point provide indications as to whether the crosswind component is a left or a right crosswind and whether the course component is a headwind or a tailwind, respectively.

The arrangement of the scales on the computer 100 is such that it can be used to easily and quickly solve wind vector problems trigonometrically using the right triangle solution technique rather than graphically, as described above. This feature is particularly useful when high wind speeds are encountered as, for example, when following the jet streams. Such wind vector problems can be graphically solved, in the manner described above, however, the accuracy of the computers is not as great.

As an example, suppose that the (1) true course is 060°,
(2) true airspeed is 360 knots,
(3) the wind direction is 250°, and that
(4) the windspeed is 132 knots.

In solving this wind vector problem, the 0° index 35 and the 90° index 36 first are aligned with the indicia on the speed scale 28 corresponding to the wind speed which, in this case, is 132 knots, as illustrated in FIG. 12. The indicia 060° (which is the true course) of the compass rose 40 on the disc 16 is aligned with the true course index 39 (FIG. 12), the relative wind now is read on the compass rose or relative wind scale 38 opposite the indicia 250° (which corresponds to the wind direction) of the compass rose 40. It can be seen that the relative wind is 10°.

The course component of the wind is now determined by reading 130 knots on the speed scale 28, below and aligned with the indicia 10° on the cosine scale 32. This value is recorded in the box labeled CC on the matted surface area in the quadrant in which the relative wind value is read, in this case, the area 104. The arrow 109 indicates that course component is a tailwind and the indicia GS(+) indicates that this course component is to be added to the effective true airspeed to determine ground speed. The crosswind component is determined by reading 23 knots on the speed scale 28, over and aligned with the indicia 10° on the sine scale 34. This value is recorded in the box labeled XC of the matted surface area 104. Again, noting the direction of the arrow 108, it can be seen that this is a left crosswind.

Now, the 0° and the 90° indexes 35 and 36 are aligned with the indicia on the speed scale 28 corresponding to the true airspeed which, in this case, is 360 knots, as illustrated in FIG. 13. Knowing the crosswind component is 23 knots, the crab angle is determined by reading the value 3½° on the sine scale 34, below and substantially aligned with the 23 on the speed scale 28. A rule of thumb to follow in determining the crab angle is to use the small angles if the crosswind component is less than ⅒ of the true airspeed. Applying this rule in the instant case, ⅒ of the true airspeed would be 36 knots and the crosswind component is only 23 knots, hence the small angle 3½° rather than 40° is used. The indicia DC(—) indicates that the true heading is determined by subtracting the crab angle 3½° from the true course of 060°. The true heading therefore is 056.5°.

The ground speed, as indicated by the indicia GS(+) is determined by adding the course component to the product of the cosine of the crab angle times the true airspeed. The product of the cosine of the crab angle times the true airspeed is determined by reading the value indicated on the airspeed scale 28, below and aligned with the angle 3½° on the cosine scale 32. In this case, for all practical purposes, it can be seen that this value is just slightly less than 360 knots. Adding the tailwind of 130 knots to this, it is determined that the ground speed is 490 knots.

From the above description, it can be seen that the wind speed components, the crab angle, the true heading and the ground speed all can be easily, quickly and accurately determined, regardless of the wind speed. Also, the matted surface areas 102–105 provide means for temporarily recording the computed crosswind and course components so that these values are readily available for use and need not be remembered. Furthermore, the legends and indicia associated with these matted surface areas provide ready indications as to how these values as well as other computed values are handled to solve the wind speed problems. Accordingly, by using the computer 100 in the above described manner, the likelihood of errors being made in remembering the computed values and adding or subtracting these and other computed values in the proper fashion is substantially eliminated.

It will thus be seen that the objects set forth above, among those made apparent from the preceding description, are efficiently attained and, since certain changes may be made in the above article without departing from the scope of the invention, it is intended that all matter contained in the above description or shown in the accompanying drawings shall be interpreted as illustrative and not in a limiting sense.

Now that the invention has been described, what is claimed as new and desired to be secured by Letters Patent is:

1. A computer for the solution of navigational problems comprising a plurality of cooperating discs mounted on a common central axis and rotatable with respect to each other; a first one of said discs having a numerical logarithmic air-speed scale circumferentially formed on it; a second one of said discs having a true course index and logarithmic trigonometric cosine and sine scales circumferentially arranged thereon and having aligned indexes, said scales each effectively having a range of 0° to 90° in opposite directions from said aligned indexes and being positioned with respect to said logarithmic numerical air-speed scale to permit both the course wind and crosswind components of the wind to be simultaneously determined and read on the appropriate one of said cosine and sine scales with a single setting of the wind speed value on the air-speed scale with the indexes of said scales, and said scales being further positioned to permit both the drift correction angle and the effective true airspeed to be simultaneously determined and read on the appropriate one of said cosine and sine scales with a single setting of the true air-speed value of the airspeed scale with the indexes of said scales; and a third one of said discs having a compass rose circumferentially formed on it; said true course index and said compass rose being cooperatively positioned with respect to one another to set and read true courses on said compass rose; said second one of said disc further having compass rose segments thereon cooperatively arranged with said true course index and functionally positioned to operate with said compass rose on said third one of said discs to determine relative wind angles, said first, second and third discs being of various size diameters and having appropriate transparent areas thereon which permit the scales to be observed when said discs are rotatably affixed together atop one another.

2. The computer of claim 1 further including a matted surface area on said third one of said discs, said matted surface area being approximately legended to indicate which of certain computed data is to be recorded for further use in solving navigational problems, whereby the need to remember said computed data is eliminated.

3. The computer of claim 2 wherein there is a matted surface area on said third one of said discs positioned in spaced relationship in each of the four quadrants thereof.

4. The computer of claim 3, further including a pair of arrows associated with each of said matted surface areas for providing an indication as to whether the course component of the wind is a headwind or a tailwind and whether the crosswind component is from the right or left.

References Cited
UNITED STATES PATENTS

| | | | |
|---|---|---|---|
| 2,438,730 | 3/1948 | Watter | 33—76 |
| 2,446,433 | 8/1948 | Putnam | 235—61 |
| 3,013,720 | 12/1961 | Steinkoenig | 235—78 |
| 3,050,249 | 8/1962 | Awramik et al. | 235—78 |

RICHARD B. WILKINSON, Primary Examiner

STANLEY A. WAL, Assistant Examiner

U.S. Cl. X.R.

235—61